(12) United States Patent
Moore et al.

(10) Patent No.: US 7,584,269 B2
(45) Date of Patent: Sep. 1, 2009

(54) METHOD FOR PROVIDING KIOSK SERVICE OFFERINGS IN A PERSONAL AREA NETWORK

(75) Inventors: Victor S. Moore, Boynton Beach, FL (US); Edith H. Stern, Yorktown Heights, NY (US); Berry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/803,256

(22) Filed: Mar. 9, 2001

(65) Prior Publication Data
US 2002/0129170 A1 Sep. 12, 2002

(51) Int. Cl.
*G06F 15/16* (2006.01)
(52) U.S. Cl. .................... 709/219; 709/217; 709/218; 709/220; 709/226; 709/250; 455/3.01; 455/3.06; 455/414.1
(58) Field of Classification Search ............... 709/203, 709/217, 219, 201; 379/144.05, 93.05, 93.07; 455/3.01
See application file for complete search history.

(56) References Cited

U.S. PATENT DOCUMENTS

| | | | | |
|---|---|---|---|---|
| 5,218,633 A * | 6/1993 | Clagett et al. | .......... | 379/144.04 |
| 5,968,117 A * | 10/1999 | Schuetze | ................... | 709/206 |
| 6,243,450 B1 * | 6/2001 | Jansen et al. | ........... | 379/144.01 |
| 6,320,946 B1 * | 11/2001 | Enzmann et al. | ............ | 379/143 |
| 6,327,570 B1 * | 12/2001 | Stevens | ......................... | 705/7 |
| 6,337,981 B1 * | 1/2002 | Peters | ..................... | 455/432.3 |
| 6,356,905 B1 * | 3/2002 | Gershman et al. | ............. | 707/10 |
| 6,452,910 B1 * | 9/2002 | Vij et al. | ..................... | 370/310 |
| 6,487,180 B1 * | 11/2002 | Borgstahl et al. | ........... | 370/310 |
| 6,490,443 B1 * | 12/2002 | Freeny, Jr. | ................... | 455/406 |
| 6,490,616 B1 * | 12/2002 | Maryka et al. | .............. | 709/222 |

(Continued)

OTHER PUBLICATIONS

Riku Mettala, *Bluetooth Protocol Architecture Version 1.0*, Nokia Mobile Phones (1999).

(Continued)

*Primary Examiner*—Bunjob Jaroenchonwanit
*Assistant Examiner*—Dohm Chankong
(74) *Attorney, Agent, or Firm*—Akerman Senterfitt

(57) ABSTRACT

A method for delivering electronic services in a personal area network (PAN) can include providing a kiosk in a publicly traversable area. The kiosk can be configured to deliver electronic services over short-range radio communications links to wireless devices in a personal area network (PAN). The kiosk also can be configured to communicate over an existing physical communications link medium. A PAN can be established in the publicly traversable area. Electronic services can be selectably retrieved through the existing physical communications link medium into the kiosk. Finally, the retrieved selected electronic services can be delivered to wireless devices in the PAN over the short-range radio communications link. Notably, the step of establishing a PAN in the publicly traversable area can include establishing a BLUETOOTH-based PAN with wireless devices in the publicly traversable area. In addition, the step of providing a kiosk first can include retrofitting an existing kiosk both with a short-range radio frequency communications system, and with a host computing device for selectively retrieving electronic services over the existing physical communications link medium, and for delivering selected electronic services to the wireless devices in the PAN. Second, the retrofitted kiosk can be activated in the publicly traversable area.

17 Claims, 5 Drawing Sheets

U.S. PATENT DOCUMENTS

| | | | |
|---|---|---|---|
| 6,532,368 B1 * | 3/2003 | Hild et al. | 455/515 |
| 6,577,720 B1 * | 6/2003 | Sutter | 379/144.05 |
| 6,578,075 B1 * | 6/2003 | Nieminen et al. | 709/221 |
| 6,587,835 B1 * | 7/2003 | Treyz et al. | 705/14 |
| 6,601,039 B1 * | 7/2003 | Kolls | 705/14 |
| 6,601,040 B1 * | 7/2003 | Kolls | 705/14 |
| 6,606,602 B1 * | 8/2003 | Kolls | 705/14 |
| 6,704,774 B2 * | 3/2004 | Terranova | 709/219 |
| 6,731,940 B1 * | 5/2004 | Nagendran | 455/456.1 |
| 6,813,608 B1 * | 11/2004 | Baranowski | 705/6 |
| 2001/0039571 A1 * | 11/2001 | Atkinson | 709/217 |
| 2001/0053996 A1 * | 12/2001 | Atkinson | 705/14 |
| 2001/0054066 A1 * | 12/2001 | Spitzer | 709/203 |
| 2003/0061271 A1 * | 3/2003 | Pittarelli | 709/203 |

OTHER PUBLICATIONS

*1 Specification of the Bluetooth System Wireless Connections Made Easy*, Bluetooth SIG (1999).

* cited by examiner

METHOD FOR PROVIDING KIOSK SERVICE OFFERINGS IN A PERSONAL AREA NETWORK

BACKGROUND OF THE INVENTION

1. Technical Field

This invention relates to the field of personal area networking and more particularly to a system and method for providing kiosk service offerings in a personal area network.

2. Description of the Related Art

In recent times, the Internet has experienced phenomenal growth with more and more people accessing data and applications on the Internet through personal computers, and more recently, network computers. Historically, computing applications have been distributed as shrink-wrapped client applications. More recently, however, businesses have invested in Internet-distributed, Web-based applications, for instance Web-based customer relationship management (CRM) applications. An application service provider (ASP) is an entity that offers individuals and companies access to applications and related services over the Internet that would otherwise have to be located in their own personal or enterprise computers. Sometimes referred to as "apps-on-tap," ASP services are an important alternative, not only for smaller companies with low budgets for information technology, but also for larger companies as a form of outsourcing.

While ASPs can provide applications and services to enterprises and individuals on a pay-per-use or subscription basis, larger entities provide their own internal ASP service moving applications off personal computers and installing the applications on an application server designed to communicate with thin-client workstations. By employing an ASP architecture, enterprises can reassert central control over application cost and usage similar to the central control experience by enterprises prior to the advent of the personal computer during the era of the mainframe computer.

To date, the ASP architecture has not been employed as widely in the wireless arena as it has in the wire-line arena. Specifically, whereas client access to distributable applications is growing among traditional wire-line networked clients, client access has been limited for wireless devices, such as handheld computers. Recently, pervasive computing has suggested the distribution of data to wireless devices using conventional infrared communications technology. In terms of wire-bound, cable replacement, the infrared standard promulgated by the Infrared Data Association (IRDA) is well known and widespread. Though the IRDA promulgated standard is a fast wireless technology, the IRDA promulgated standard is limited to point-to-point connections and above all, infrared communications require a clear line-of-sight between an infrared receiver and an infrared transmitter. Additionally, infrared communication technologies have experienced problems with incompatible standard implementations.

Recently, wireless phone service providers also have begun to provide wireless access to Internet distributed data through cellular communications links. Still, long-range radio communication technologies like cellular communications links can be expensive and power-consuming. Moreover, cellular transmitters and receivers require device housing space which can dramatically add to the overall size of a wireless device. Finally, long-range radio communications links can be limited in bandwidth. Hence, cellular technologies are not suitable for the distribution of applications from an ASP to pervasive computing devices such as handheld computers.

A new type of wireless connection has been introduced into the wireless market. Emerging standards for personal area networks (PANs), for instance the BLUETOOTH (TM) standard, enjoys a communications profile which is substantially different than the communications profile associated with cellular networks and infrared technologies. In particular, unlike cellular networks, PANs operate over a very limited local range. As an example, BLUETOOTH operates in "piconets" having a normal range of ten (10) meters and a maximum range of approximately one-hundred (100) meters. Accordingly, short-range radio communication links lack the deficiencies of both infrared and cellular technologies which have limited the distribution of electronic services such as applications and data over wireless communications links.

SUMMARY OF THE INVENTION

The present invention provides a method for providing electronic services such as applications and data to wireless devices in a personal area network (PAN) via a kiosk. The invention incorporates service discovery protocols and short-range radio communications to allow wireless devices entering the PAN to identify the kiosk and request therefrom selected electronic services. In consequence, electronic services can be delivered to a wide variety of wireless devices without consuming substantial system resources and network bandwidth. Additionally, heretofore single-purpose existing kiosks, such as payphones, ticket counters and gasoline station islands, can be extended to offer new electronic services thereby adding value to these existing kiosks.

A method for providing kiosk service offerings can include several steps. First, a kiosk can be configured to provide electronic services over short-range radio communications links to wireless devices in a personal area network (PAN). In particular, in one aspect of the present invention, the configuring step can include retrofitting an existing kiosk both with a short-range radio frequency communications system, and with a host computing device for selectively retrieving electronic services over the existing physical communications link medium, and for delivering selected electronic services to the wireless devices in the PAN. The kiosk also can be configured to communicate over an existing physical communications link medium. For instance, the existing physical communications link medium can be one of a telephone network communications link and a data communications link. Second, a short-range radio communications link can be established with a wireless device in the PAN. In one aspect of the invention, the short-range radio communications link can be a BLUETOOTH-based communications link. Third, selected electronic services can be retrieved over the existing physical communications link medium. Finally, the retrieved selected electronic services can be delivered to the wireless device in the PAN over the short-range radio communications link.

The step of retrieving specified electronic services over the existing communications network can include retrieving electronic messages from an electronic mail server communicatively linked to the kiosk over the existing physical communications link medium. In consequence, the step of delivering the retrieved specified electronic services to the wireless device in the PAN over the short-range radio communications link can include delivering the retrieved electronic mail to an electronic mail client in the wireless device. By comparison, the step of retrieving specified electronic services over the existing physical communications link medium can include retrieving an application from an application service provider (ASP) communicatively linked to the kiosk over the existing physical communications link medium. Accordingly, the step of delivering the retrieved specified electronic services to the wireless device in the PAN over the short-range radio communications link can include delivering the retrieved application for execution in the wireless device.

Importantly, the method of the invention can additionally include the steps of determining if the specified electronic services wholly reside in the kiosk; and, if it is determined that the specified electronic services wholly reside in the kiosk, delivering the specified electronic services to the wireless device in the PAN without retrieving the specified electronic services over the existing physical communications link medium. Also, it can be determined if components of the specified electronic services reside in the kiosk. Subsequently, the components determined to reside in the kiosk can be delivered to the wireless device while components not residing in the kiosk can be retrieved from over the existing physical communications link medium. Advantageously, the step of delivering the retrieved specified electronic services to the wireless device in the PAN over the short-range radio communications link can include delivering retrieved components of the specified electronic services to the wireless device while retrieving remaining components of the specified electronic services.

A kiosk for distributing electronic services to wireless devices in a PAN can include a kiosk configured to communicate with a communications network over an existing physical communications link medium; a network communications client for communicating with servers in the communications network; a short-range radio communications system for communicating with wireless devices in the PAN; and, a list of electronic services which can be distributed to wireless devices in the PAN, the electronics services in the list residing locally in the kiosk and remotely in the servers in the communications network. Notably, the short-range radio communications system can include a short-range radio communications system configured in accordance with BLUETOOTH specifications. In addition, the kiosk can be a public telephone, a gasoline station island, an airline check-in desk, a ticketing booth, a retail check-out counter, a toll booth, or an automatic teller machine. The physical communications link medium can be a telephone network communications link or a data communications link. Moreover, the server can be an application server. Finally, the communications network can be an Internet.

A method for delivering electronic services in a personal area network (PAN) can include providing a kiosk in a publicly traversable area. The kiosk can be configured to deliver electronic services over short-range radio communications links to wireless devices in a personal area network (PAN). The kiosk also can be configured to communicate over an existing physical communications link medium. A PAN can be established in the publicly traversable area. Electronic services can be selectably retrieved through the existing physical communications link medium into the kiosk. Finally, the retrieved selected electronic services can be delivered to wireless devices in the PAN over the short-range radio communications link. Notably, the step of establishing a PAN in the publicly traversable area can include establishing a BLUETOOTH-based PAN with wireless devices in the publicly traversable area. In addition, the step of providing a kiosk first can include retrofitting an existing kiosk both with a short-range radio frequency communications system, and with a host computing device for selectively retrieving electronic services over the existing physical communications link medium, and for delivering selected electronic services to the wireless devices in the PAN. Second, the retrofitted kiosk can be activated in the publicly traversable area.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a system and method for providing kiosk service offerings in a personal area network (PAN). More specifically, a kiosk, for example a public telephone, a gasoline station island, an airline check-in desk, a ticketing booth, a retail check-out counter, a toll booth, or an automatic teller machine, can be configured with a short-range radio communications system for transmitting and receiving data wirelessly in a PAN. Notably, the kiosk can be communicatively linked to an existing communications network. The kiosk can establish short-range radio communications links with wireless devices which enter the PAN. Once a short-range radio communications link has been established with the wireless device, the kiosk can retrieve over the existing communications network selected electronic services such as applications and data. The kiosk, in turn, can transmit the retrieved selected electronic services to the wireless device in the PAN over the short-range radio communications link.

Figure 1:
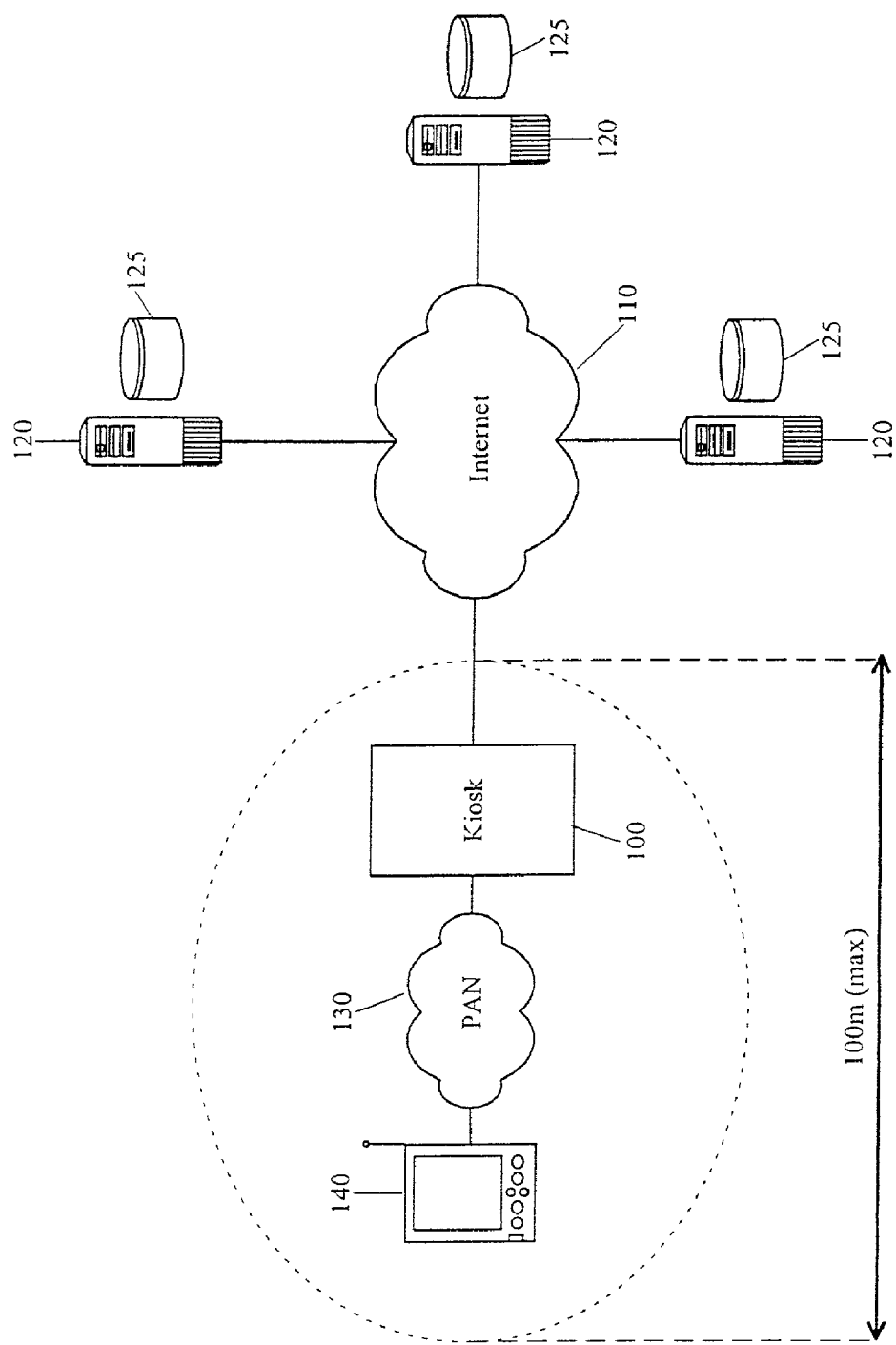
FIG. 1 is a schematic diagram illustrating an exemplary system for providing kiosk service offerings in a PAN.

FIG. 1 is a schematic diagram illustrating an exemplary system for providing kiosk service offerings in a PAN. As shown in FIG. 1, the system can include both a PAN 130 and an existing communications network 110, for example the Internet. The existing communications network 110 can include a plurality of servers 120 which can distribute electronic services such as data and applications to requesting clients. The electronic services can be stored in network storage 125. Notably, while FIG. 1 depicts network storage 125 as an entity positioned closely to the servers 120, the invention is not limited in this regard and the network storage 125 can be positioned elsewhere in the communications network from where the network storage 125 can be remotely accessed by the servers 120. Importantly, the servers 120 can be application servers or data servers.

In accordance with the inventive arrangements, a kiosk 100 can be communicatively linked to the communications network 110. In particular, the kiosk 100 can be linked through wireline means, for example a T-1 or DSL communications link, or wirelessly through cellular or other radio frequency (RF) means. In accordance with the inventive arrangements, the kiosk 100 can be any self-contained structure, such as a public telephone, a gasoline station island, an airline check-in desk, a ticketing booth, a retail check-out counter, a toll booth, or an automatic teller machine. Advantageously, typical kiosks include access to communications networks such as a public switched telephone network (PSTN) via communications links through which the communications network 110 can be accessed.

The kiosk 100 can be configured with short a range radio frequency system with which the kiosk 100 can participate in the PAN 130. By participate, it is meant that the kiosk 100 can detect PAN-enabled devices 140 geographically proximate to the kiosk 100 with which the kiosk 100 can establish a communications connection over which the kiosk 100 can transmit and receive data. Typically, the geographic proximity between two communicating devices in the PAN 130 does not exceed 100 meters, although the invention is not limited to the precise communications characteristics of the short-range radio frequency communications system used to establish the PAN 130. Rather, the present invention contemplates the characteristics of any suitable short-range radio frequency communications system with which the PAN 130 can be established.

Figure 2:
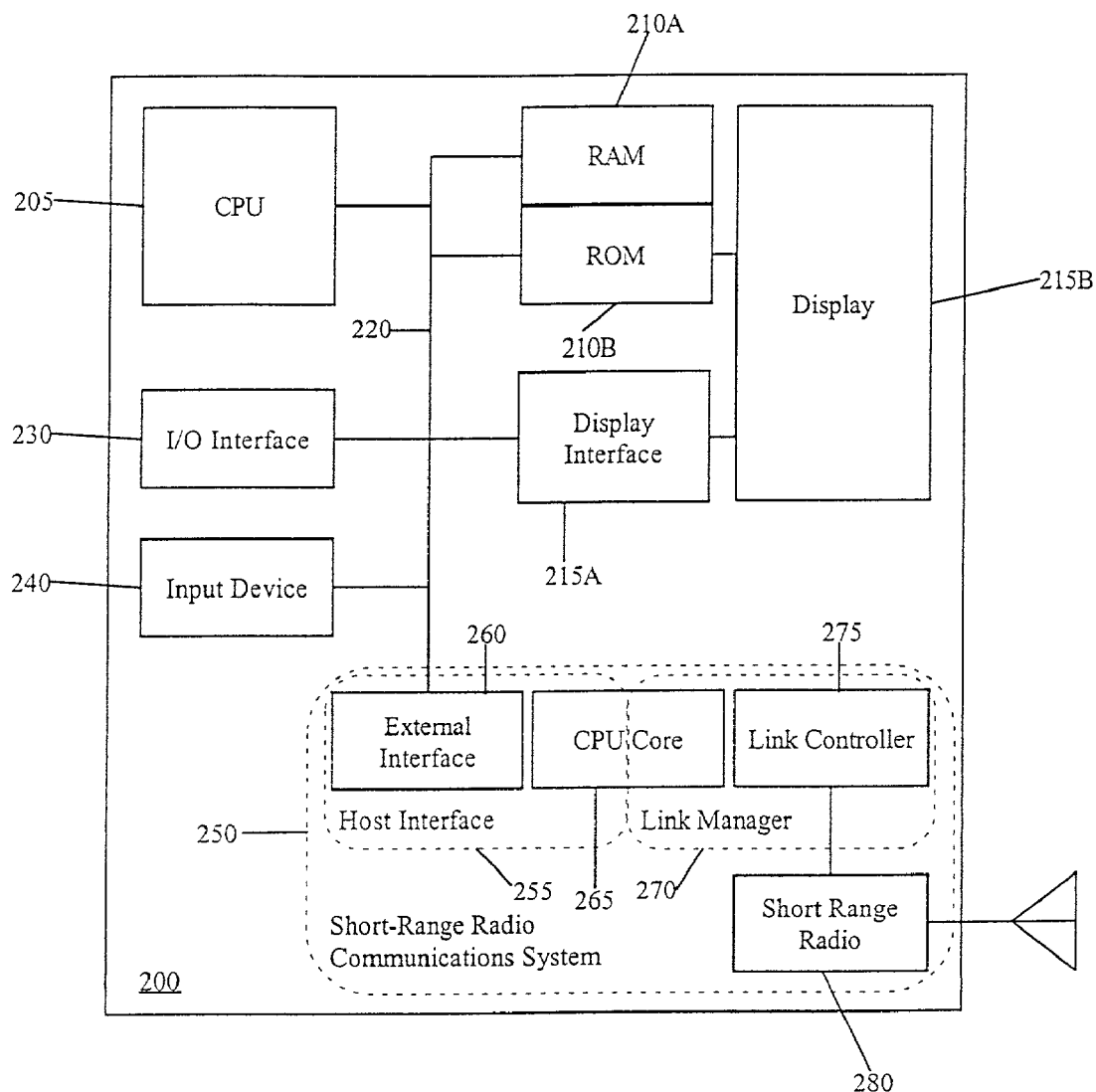
FIG. 2 is a schematic diagram illustrating a device enabled for short-range radio communications in the PAN of FIG. 1.

The kiosk 100 can be PAN-enabled by including with the kiosk 100 a host device configured for short-range radio communications in the PAN 130. FIG. 2 is a schematic diagram illustrating a host device 200 configured for short-range radio communications in the PAN 130 of FIG. 1. The host device 200 can include a central processing unit (CPU) 205, memory 210A, 210B, a display interface 215A and corresponding display 215B, an input/output (I/O) interface 230 and input device 240. As shown in the figure, in one aspect of the present invention memory 210A can be volatile, random access memory (RAM). Similarly, memory 210B can be non-volatile, read-only memory. The display controller 215A can be any controller suitable for presenting data visually through the display 215B. The display 215B can be any conventional display such as an LCD, monitor, etc. The I/O interface 230 can be any suitable interface for receiving or transmitting data to and from the host device 200. Examples of I/O interfaces can include a serial interface, universal serial bus (USB) port, infrared port, fire-wire port, etc. Finally, the input device 240 can be any suitable device for providing user input for the device 200. Examples of input devices can include a keyboard, microphone, pointing device, touch-screen, etc.

Each of the CPU 205, memory 210A, 210B, display interface 215A and corresponding display 215B, I/O interface 230 and input device 240 can be arranged conventionally as is the case with conventional computers. In particular, each of the CPU 205, memory 210A, 210B, display interface 215A and corresponding display 215B, I/O interface 230 and input device 240 can be communicatively linked through bus 220. Notwithstanding, the invention is not limited either in regard to the particular conventional computing components which comprise the host device 200, or the particular arrangement of the conventional computing components. Rather, as will be apparent to one skilled in the art, the host device 200 configuration is limited only inasmuch as the host device 200 must include a short range radio communications system 250.

The short range radio communications system 250 can include an analog short range radio 280 and a digital host controller 255, 270. The host controller 255, 270 can include a host interface (HI) 255 and a link manager (LM) 270. The LM 270 can include a digital signal processor referred to as a link controller (LC) 275 and a CPU core 265. The HI 255 can also include the CPU core 265 and an external interface 260 to the bus 220 of the host device 200. The LC 275 consists of circuitry and firmware which can perform baseband processing and physical layer protocols such as ARQ protocol and FEC coding. The function of the LC 275 includes asynchronous data transfers, synchronous data transfers, and optionally, audio coding and encryption. The CPU core 265 can be programmed to handle inquiries and filter page requests without involving the host device 200. Specifically, the host controller 255, 270 can be programmed to answer certain page messages and authenticate remote links. The LM 270 executes on the CPU core 265. The LM discovers other LMs and communicates with them via a link manager protocol (LMP) to perform its service provider role and to use the services of the underlying LC.

A short range radio communications system in one aspect of the present invention can be implemented using standard Bluetooth™ wireless technology as described in Riku Mettala, *Bluetooth Protocol Architecture Version 1.0, Nokia Mobile Phones,* (1999) and 1 *Specification of the Bluetooth System Wireless Connections Made Easy,* Bluetooth SIG (1999), both incorporated herein by reference. Bluetooth is a low-cost, low-power, short-range radio link for mobile devices and for WAN/LAN access points. Bluetooth offers fast and reliable digital transmissions of both voice and data over the globally available 2.4 GHz ISM (Industrial, Scientific and Medical) band. The Bluetooth specification defines a short (around 10 m) or optionally a medium range (around 100 m) radio link capable of voice or data transmission up to a maximum capacity of 720 Kb/s per channel. Radio frequency (RF) operation is in the un-licensed industrial, scientific and medical (ISM) band at 2.4 to 2.48 GHz, using a spread is spectrum, frequency hopping, full-duplex signal at up to 1600 hops/sec. The signal hops among seventy-nine (79) frequencies at 1 MHz intervals to give a high degree of interference immunity. RF output is specified as 0 dBm (1 mW) in the 10 m-range version and −30 to +20 dBm (100 mW) in the longer range version.

Bluetooth enabled devices which come within range of each other can establish an ad hoc point-to-point and/or point-to-multipoint connections. Bluetooth enabled devices dynamically can be added to or removed from a PAN. Notably, two or more Bluetooth enabled units which share a channel form a piconet. Several piconets can be established and linked together in ad hoc "scatternets" to allow communication and data exchange in flexible configurations. If several other piconets are within range, each can operate independently while maintaining access to the full bandwidth of the scatternet. Each piconet is established by a different frequency hopping channel. All users participating on the same piconet are synchronized to this channel. Notably, unlike infrared devices, Bluetooth enabled devices are not limited to line-of-sight communication.

Figure 3:
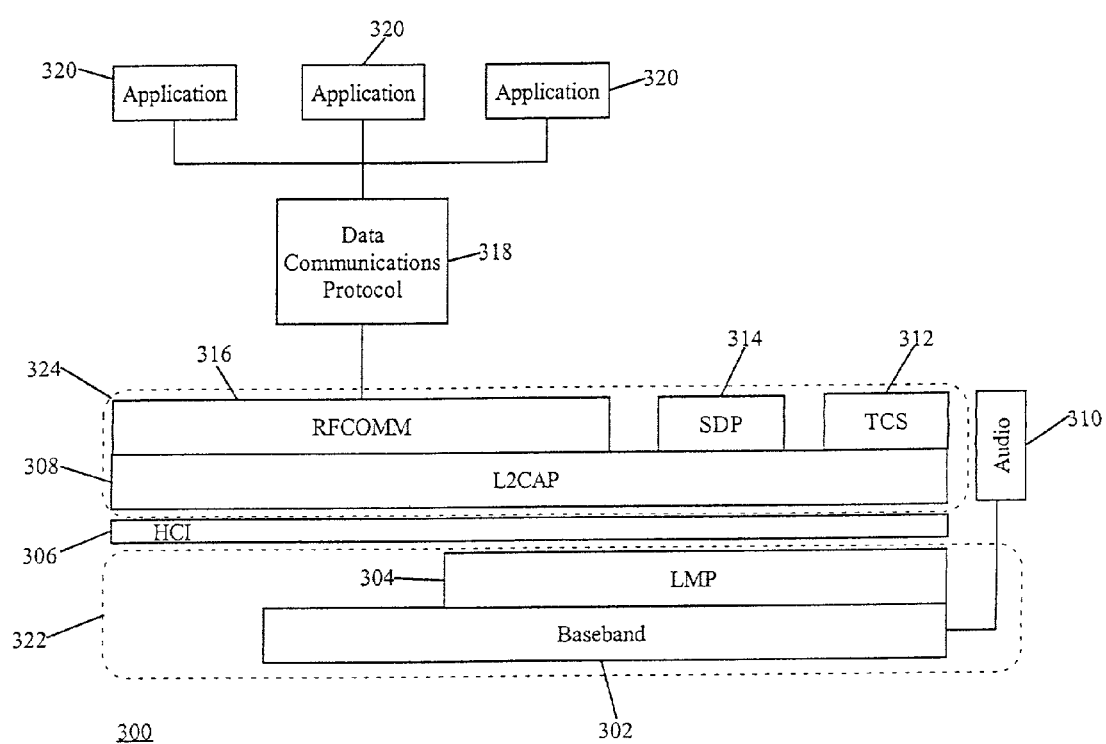
FIG. 3 is an architecture suitable for use in the device of FIG. 2.

FIG. 3 illustrates a short range radio communications architecture 300 suitable for use in the device of FIG. 2. The architecture 300 can include radio communications device based low level baseband services 322 and host device-based high level protocols 324 through which external host computing applications 320 can communicate using standard communications protocols 318 such as TCP/IP or UDP/IP with other devices in the PAN. Notably, in order to facilitate compatibility between different hardware implementations associated with the low level baseband services 322, a host controller interface (HCI) 306 can be used as a common interface between the host computing device and the radio communications system core. Higher level protocols like the service discovery protocol (SDP) 314, RFCOMM 316 (emulating a serial port connection) and the Telephony Control protocol (TCS) 312 are interfaced to the low level baseband services 322 via a logical link control and adaptation protocol (L2CAP) 308. Notably, the SDP 314 allows applications to find out about available services and their characteristics when devices are moved or switched off. Among the tasks associated with L2CAP 308, L2CAP 308 can perform the segmentation and reassembly of data to allow larger data packets to be carried over a short range radio communications baseband connection.

The host device 200 as configured in FIG. 2 with the short range radio communications system 250 and having the architecture of FIG. 3 can be included as both as part of a PAN-enabled kiosk such as kiosk 100 of FIG. 1, and as part of a PAN-enabled device such as the PAN-enabled device 140 of FIG. 1. Exemplary PAN-enabled devices which can be configured to operate with a short range radio communications system 250 as shown in FIG. 2 can include personal digital assistants (PDAs), cellular phones, handheld computers, laptop/notebook computers, wristwatches, etc. In contrast, where a kiosk includes the conventional computing components shown as included in the host device 200 of FIG. 2, a short range radio communications system 250 can be directly connected to a computing device in the kiosk 100 wherein suitable higher level protocols for driving the short range radio communications system 250 are installed in the computing device. Alternatively, a standalone pre-configured computing device can be added to the kiosk 100 and communicatively linked to existing communications network links residing in the kiosk 100.

Referring back to FIG. 1, in operation a kiosk 100 can be configured with a short range radio communications system so as to participate in the PAN 130 as an electronic service provider. When a PAN-enabled device 140, such as a Bluetooth enabled PDA enters the piconet formed by the PAN 130, the PAN-enabled device can retrieve a list of available electronic services from the kiosk 100. Electronic services can include, but are not limited to distributed applications and data, for example electronic mail, sports scores, and stock prices. One or more particular electronic services can be selected in the PAN-enabled device 140 responsive to which the kiosk 100 can distribute the selected electronic services to the device 140. If, however, the kiosk 100 does not have locally stored therein a selected electronic service, the kiosk 100 can request the missing service from an server 120 in the existing communications network 110. Upon receipt of the missing service from the appropriate server 120, the kiosk 100 can forward the service to the PAN-enabled device 140 in the PAN 130.

Figure 4:
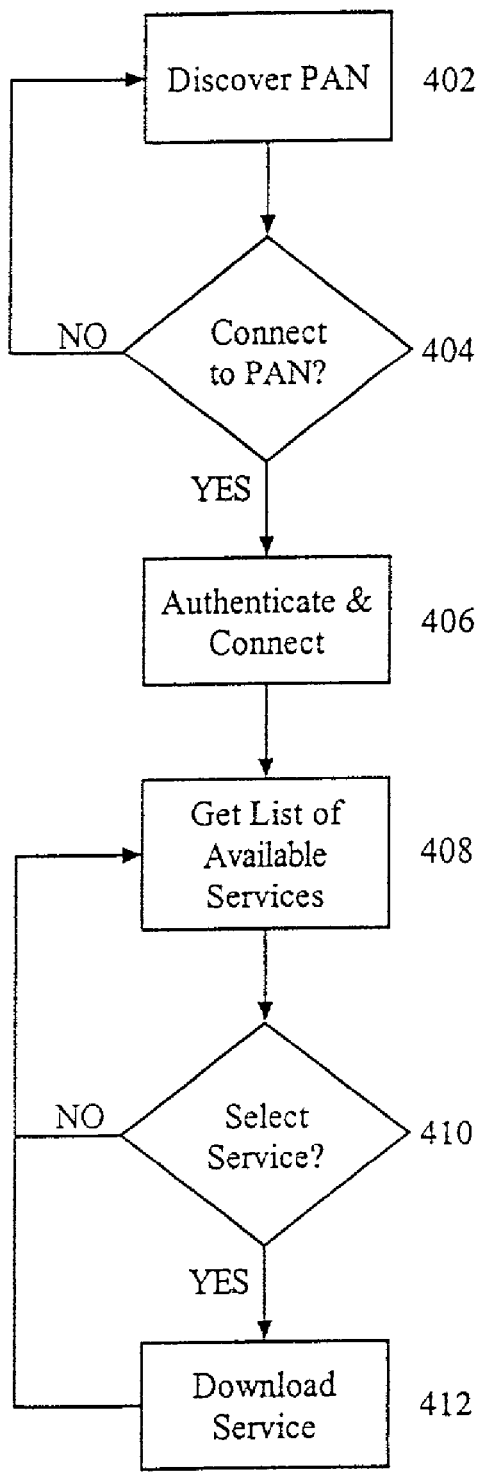
FIG. 4 is a flow chart illustrating a process for receiving distributed electronic services in a PAN via a PAN-configured kiosk.

FIG. 4 is a flow chart illustrating a process performed in a PAN-enabled device for receiving distributed electronic services in a PAN via a PAN-enabled kiosk. Beginning in step 402, a PAN-enabled device entering a PAN can electronically detect the presence of the PAN using, for example conventional service discovery protocols. Service discovery protocols are well-known in the art and provide devices in ad hoc peer-to-peer networks to dynamically discover devices and services. As such, service discovery architectures enable self-configuring dynamic networks by providing a standard method for applications, services and devices to describe and to advertise their capabilities to other applications, services and devices and to discover their capabilities. Service discovery architectures also enable applications, services and devices to search other applications, services or devices for a particular capability, and to request and establish interoperable sessions with them to utilize those capabilities.

Returning now to FIG. 4, in step 404, the device can determine whether to connect to or ignore the PAN. Specifically, the connection determination can be performed by a user, or by the device automatically based on pre-configured selections such as "connect to all PANs" or "connect to the following PANs only". If, in step 404 the device chooses to connect to the PAN, in step 406 the device can undertake and authentication process prior to connection during which process the device can be recognized as a legitimate PAN client and associated with a unique identifier through which other devices in the PAN can recognize and communicate with the PAN-enabled device.

Once connected, in step 408, the PAN-enabled device can identify the PAN-enabled existing kiosk and can query the kiosk for available electronic services. Alternatively, upon detecting the presence of the PAN-enabled device, the kiosk can automatically transmit a list of available electronic services to the PAN-enabled device. If in step 410 one or more electronic services are selected, either automatically by the PAN-enabled device, or manually by the user, in step 412 the selected services can be downloaded to the PAN-enabled device from the kiosk. Notably, even if no services are selected in step 410, so long as the PAN-enabled device remains in the piconet formed by the PAN, the list of available services can be accessed.

Figure 5:
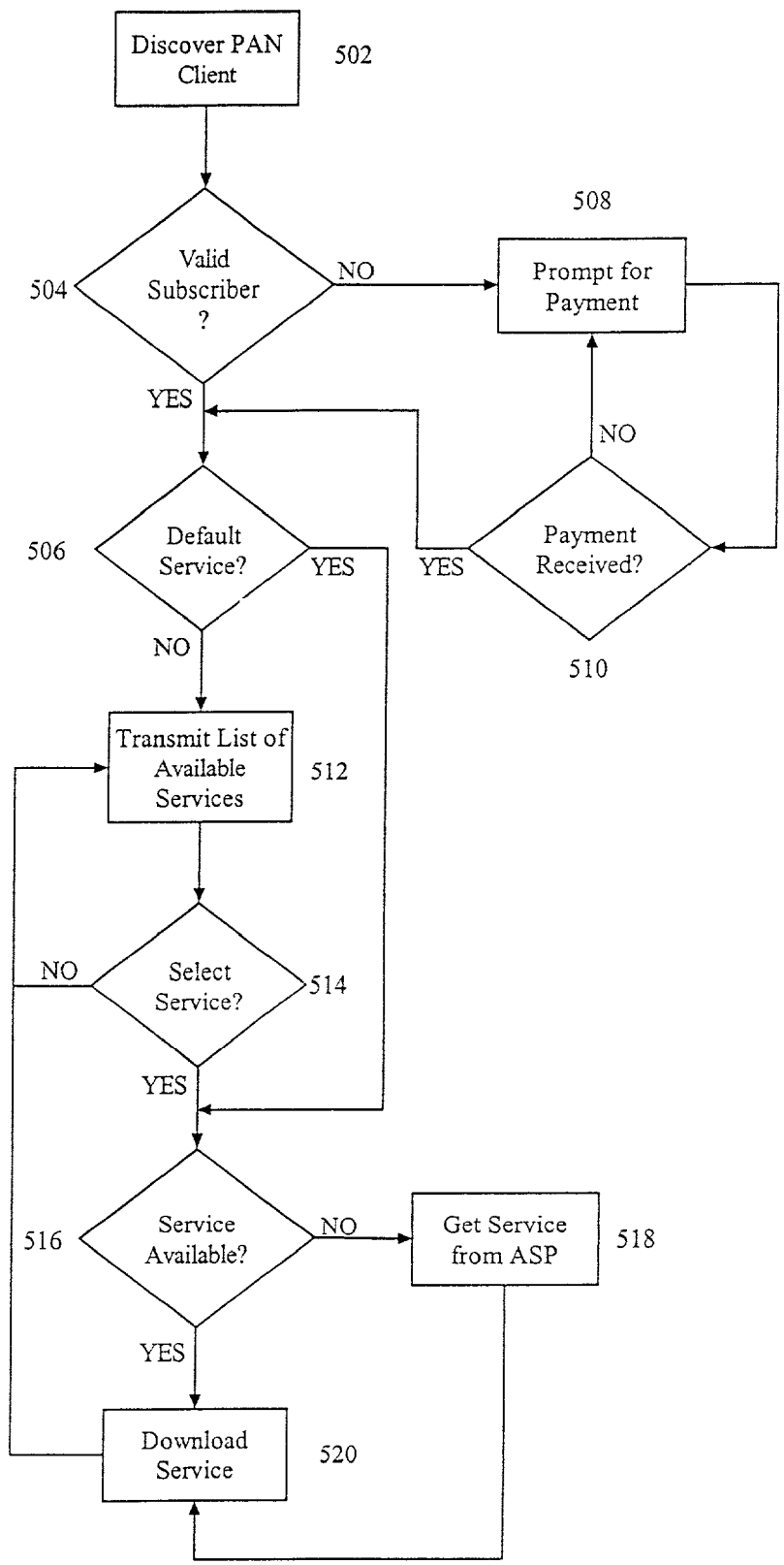
FIG. 5 is a flow chart illustrating a process for distributing electronic services from an application service provider in a communications network to a wireless device in a PAN via a PAN-configured kiosk.

By comparison, upon detecting a PAN-enabled device, a kiosk retrofitted in accordance with the inventive arrangements can undertake the process illustrated in FIG. 5. FIG. 5 is a flow chart illustrating a process for distributing electronic services from an application service provider in a communications network to a wireless device in a PAN via the retrofitted kiosk. Beginning in step 502, the kiosk can detect the presence of a PAN-enabled device using, for example conventional service discovery protocols. In step 504, it can be determined if the detected device is a valid subscriber to electronic services offered by the kiosk. If the detected device is not a valid subscriber, the kiosk can prompt the user of the device for pay-per-use payment in step 508. Alternatively, the kiosk can prompt the user of the device to register for a subscription. Moreover, the kiosk can provide to the device a limited trial period subscription. In any case, the invention is not limited in regard to the precise business model for providing access to services provided by the kiosk.

If in step 510 payment is received, or if in step 504 the device is determined to be a subscriber device, in step 506 it can be determined whether the detected device has associated therewith a pre-configured default electronic service. If not, in step 512 the kiosk can provide to the device a list of available services. The list can be computed based on any number of factors, for example all available services, or a limited selection based on prioritization, perceived value, or advertising revenue, historical transaction statistics, device and network resources, or a pre-configuration. In step 514, if one or more services has been selected, or if a default service is selected, in step 516 the kiosk can determine whether the complete electronic service is available locally in the kiosk, or whether one or more components of the electronic service must be retrieved from an ASP in the existing communications network.

If the kiosk is able to locally retrieve the entire selected electronic service, in step 520 the kiosk can transmit to the detected device the requested electronic service. Otherwise, if one or more components of the selected electronic service are not available locally in the kiosk, the kiosk can determine a suitable ASP from which the selected electronic service can be retrieved. Subsequently, in step 518, the kiosk can retrieve therefrom the requested electronic service. Importantly, in the case where some of the components of the electronic service are present in the kiosk while other components of the requested electronic services must be retrieved from an ASP, the kiosk can begin transmission of the present components during the retrieval of the remaining components from the ASP. Likewise, as components are retrieved from the ASP, the retrieved components can be forwarded to the device while the remaining components are retrieved. In this way, apparent and actual response times can be reduced.

Use of a kiosk configured in accordance with the inventive arrangements can permit casual use of applications by wireless devices and can involve either downloading complete applications, for example a crossword puzzle game for carry away use, or can involve more traditional ASP hosting of complex applications. Significantly, a kiosk configured in accordance with the inventive arrangements can be used for targeted service distribution, for example based on geography. More particularly, depending on the nature and location of the kiosk, particular electronic services can be stored locally in the kiosk and the kiosk can be configured to retrieve particular services from communicatively linked servers. For example, in the case of an airport or train station ticket counter, travel related electronic services such as airplane timetables, weather news, crossword puzzle programs and electronic mail can be automatically or manually distributed to travelers entering an associated PAN with a PAN enabled device. Similarly, public payphones can provide electronic services such as mapping programs and restaurant guides to devices entering an associated PAN.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

The invention claimed is:

1. A method for providing kiosk service offerings comprising:
   retrofitting an existing, publicly-located, and fixed positioned kiosk with a host computing device for selectively retrieving electronic services from remote servers over an existing physical communications link to an existing communications network and a short-range frequency communications system for delivering selected electronic services over a short-range frequency communications link to wireless devices in a personal area network PAN,
   wherein the electronic services include data and applications;
   maintaining a list of available electronic services provided by the kiosk, wherein a portion of the available electronic services are stored locally within the kiosk and wherein a different portion of the available electronic services are retrievable by the kiosk from the remote servers of the existing communications network via the existing physical communications link;
   establishing a short-range frequency wireless communications link with a wireless device in said PAN;
   in response to a subscriber query received from the wireless device, generating a subscriber-specific list of available electronic services by selecting among the list of all available electronic services, wherein the selection is based upon at least one of a subscriber prioritization, a predetermined value assigned to the subscriber, advertising revenues associated with each available service, and communication resources of the wireless device;
   conveying the subscriber-specific list to the wireless device for presentment to the subscriber;
   receiving at the kiosk a request for at least one of the available electronic services included in the subscriber-specific list, the request being received from the wireless device;
   determining whether the requested electronic services wholly reside in the kiosk and whether components of the requested electronic services reside in the kiosk;
   if it is determined that the requested electronic services wholly reside in the kiosk, delivering the requested electronic services to the wireless device in the PAN without retrieving the requested electronic services over the existing physical communications link;
   if it is determined that certain components of the requested electronic services reside in the kiosk, delivering the certain components to the wireless device while retrieving remaining components of requested electronic services over the existing physical communications link; and
   if it is determined that none of the requested electronic services resides in the kiosk, retrieving the requested electronic services over the existing physical communications link and delivering the retrieved electronic services to the wireless device in the PAN.

2. The method of claim 1, wherein said step of establishing a wireless communications link with said wireless device in said PAN comprises:
   establishing a BLUETOOTH-based communications link with said wireless device.

3. The method of claim 1, wherein said kiosk was a single purpose kiosk before said retrofitting step, and wherein the kiosk has at least two purposes after the retrofitting step, one of the two purposes being a new purpose for proving electronic services and another of the two purposes being an original purpose of the kiosk.

4. The method of claim 1, wherein said existing physical communications link is selected from the group consisting of a telephone network communications link and a data communications link.

5. The method of claim 1, wherein said step of retrieving specified electronic services over said existing communications network comprises retrieving electronic messages from an electronic mail server communicatively linked to said kiosk over said existing physical communications link.

6. The method of claim 1, wherein said step of retrieving specified electronic services over said existing physical communications link comprises retrieving an application from an application service provider (ASP) communicatively linked to said kiosk over said existing physical communications link.

7. The method of claim 1, wherein said delivering step further comprises:
   said kiosk delivering electronic mail to an electronic mail client in said wireless device.

8. The method of claim 6, wherein said retrieved application is retained within and remains executable by the wireless device even after said wireless device is disconnected from said PAN.

9. The method of claim 1, further comprises delivering retrieved components of said requested electronic services to said wireless device while retrieving remaining components of said requested electronic services.

10. The method of claim 1, wherein the kiosk functions as a wireless access point for accessing an Internet.

11. The method of claim 1, wherein the existing, single-purpose, publicly-located, and fixed positioned kiosk is selected from the group consisting of a payphone, a ticket counter, and a gasoline station island.

12. A method for delivering electronic services in a wireless personal area network (PAN) comprising:
   retrofitting an existing, publicly-located, and fixed positioned kiosk with a host computing device for selectively retrieving electronic services from remote servers over an existing physical communications link to an existing communications network and a short-range frequency communications system for delivering selected electronic services over a short-range frequency communications link to wireless devices in a personal area network PAN, wherein the electronic services include data and applications;

maintaining a list of available electronic services provided by the kiosk, wherein a portion of the available electronic services are stored locally within the kiosk, and wherein a different portion of the available electronic services are retrievable by the kiosk from the remote servers of the existing communications network via the existing physical communications link;

establishing the PAN in a publicly traversable area;

in response to a subscriber query received from the wireless device, generating a subscriber-specific list of available services by selecting among the list of all available services, wherein the selection is based upon at least one of a subscriber prioritization, a predetermined value assigned to the subscriber, advertising revenues associated with each available service, and communication resources of the wireless device;

conveying the subscriber-specific list to the wireless device for presentment to the subscriber;

receiving from the wireless device a request for at least one of the available electronic services included in the subscriber-specific list;

determining whether the requested electronic services wholly reside in the kiosk and whether components of the requested electronic services reside in the kiosk;

if it is determined that the requested electronic services wholly reside in the kiosk, delivering the requested electronic services to the wireless device in the PAN without retrieving the requested electronic services over the existing physical communications link;

if it is determined that certain components of the requested electronic services reside in the kiosk, delivering the certain components to the wireless device while retrieving remaining components of requested electronic services over the existing physical communications link; and if it is determined that none of the requested electronic services resides in the kiosk, retrieving the requested electronic services over the existing physical communications link and delivering the retrieved electronic services to the wireless device in the PAN.

13. The method of claim 12, wherein said step of establishing a PAN in said publicly traversable area comprises:

establishing a BLUETOOTH-based PAN with wireless devices in said publicly traversable area.

14. The method of claim 12, wherein said step of retrofitting the kiosk comprises retrofitting said kiosk so that the kiosk retains its original purpose while also performing a new purpose for proving electronic services; and, wherein the step of configuring said kiosk comprises activating said retrofitted kiosk in said publicly traversable area.

15. The method of claim 12, wherein the kiosk functions as a wireless access point for accessing an Internet.

16. The method of claim 12, wherein the wireless device includes input/output components configured as a user-interface for purposes related to the electronic services.

17. A method for providing electronic services to a wireless device, the method comprising:

configuring a kiosk with wireless communication capabilities to provide electronic services over short-range radio communications links to wireless devices in a personal area network (PAN), said kiosk also being configured to communicate over a physical communications link with an existing communications network for selectively retrieving electronic services from remote servers;

establishing a short-range radio communications link with a wireless device in said PAN;

in response to a subscriber query received from the wireless device, generating a subscriber-specific list of available electronic services by selecting among a list of all available electronic services, wherein the selection is based upon at least one of a subscriber prioritization, a predetermined value assigned to the subscriber, advertising revenues associated with each available service, and communication resources of the wireless device;

conveying the subscriber-specific list to the wireless device for presentment to the subscriber;

receiving at the kiosk a request for at least one of the available electronic services included in the subscriber-specific list, the request being received from the wireless device;

determining whether the requested electronic services wholly reside in the kiosk and whether components of the requested electronic services reside in the kiosk;

if it is determined that the requested electronic services wholly reside in the kiosk, delivering the requested electronic services to the wireless device in the PAN without retrieving the requested electronic services over the existing physical communications link;

if it is determined that certain components of the requested electronic services reside in the kiosk, delivering the certain components to the wireless device while retrieving remaining components of requested electronic services over the existing physical communications link; and if it is determined that none of the requested electronic services resides in the kiosk, retrieving the requested electronic services over the existing physical communications link and delivering the retrieved electronic services to the wireless device in the PAN;

wherein the requested electronic services are configured for execution in said wireless device.

* * * * *